Feb. 27, 1940. F. C. WOOD 2,191,701
DISPLAY APPARATUS
Filed May 10, 1938 3 Sheets-Sheet 3
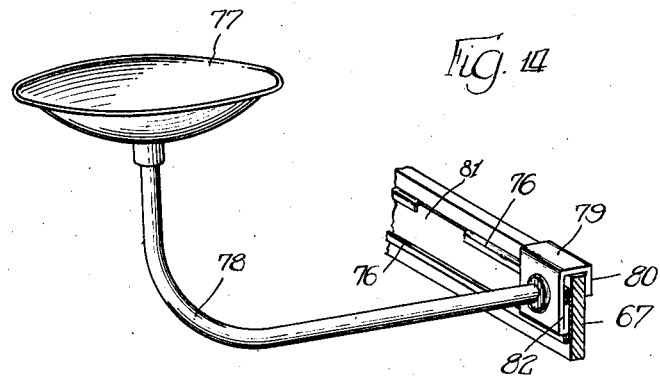
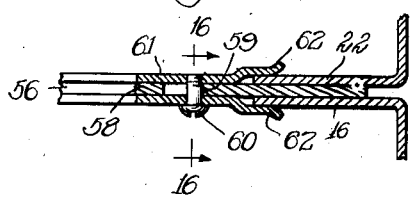
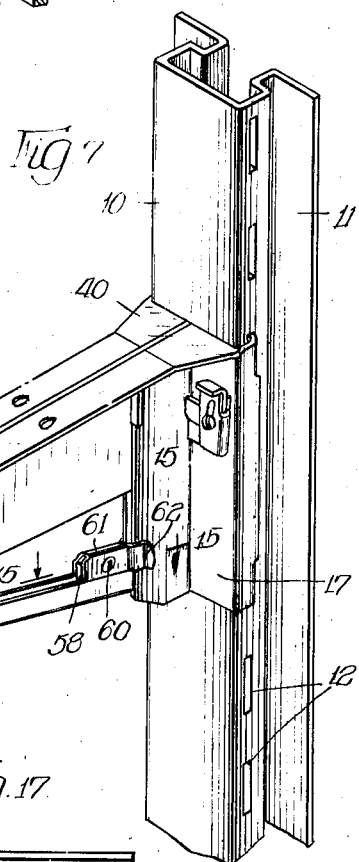
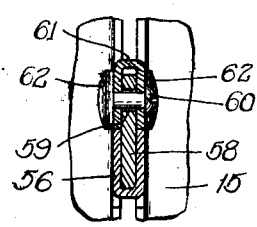
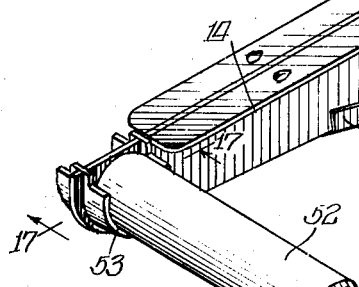
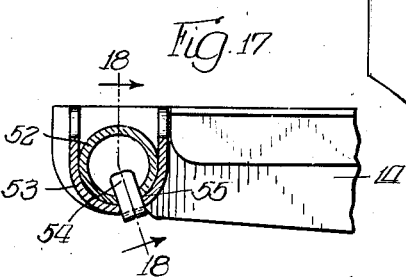
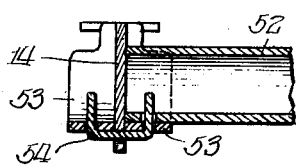
INVENTOR.
Fred C. Wood,
BY
ATTORNEYS Patented Feb. 27, 1940

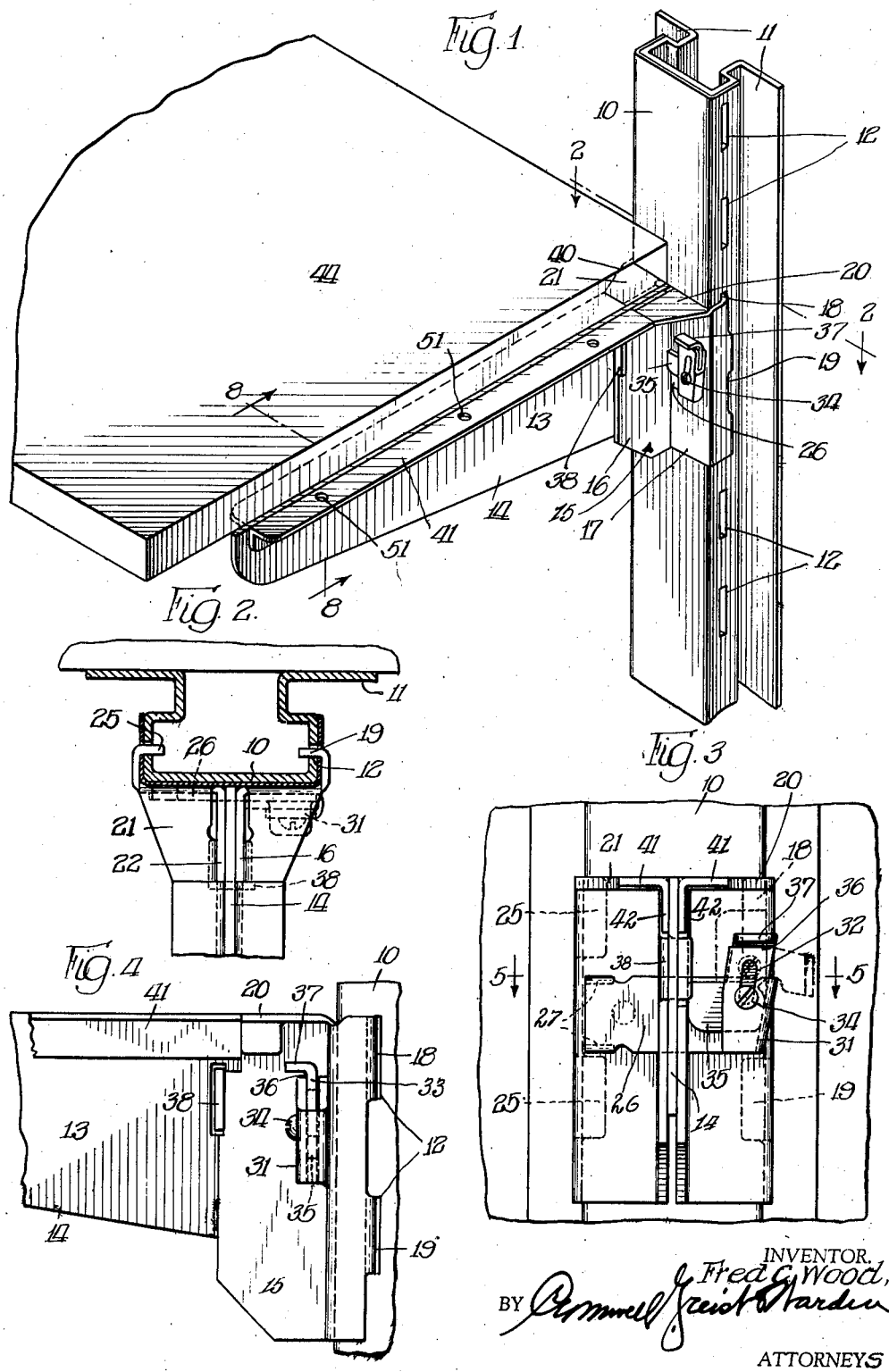

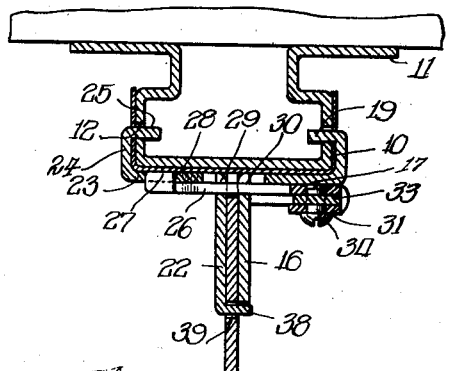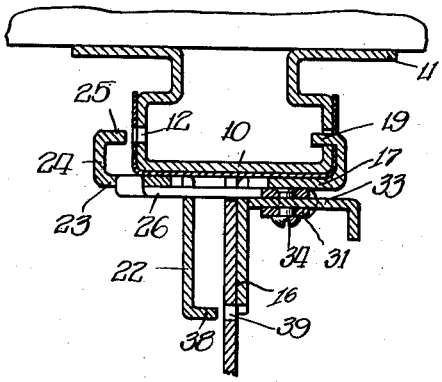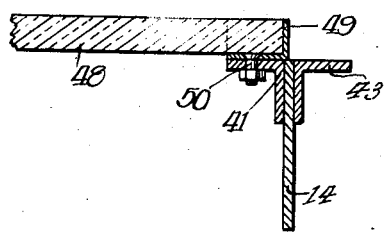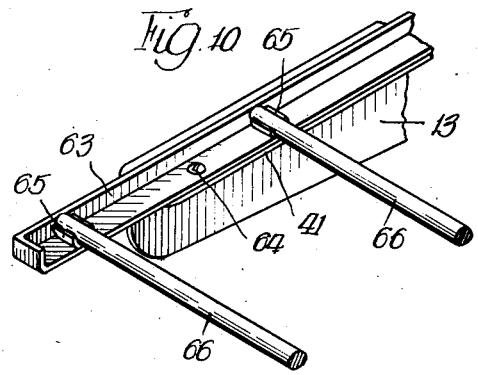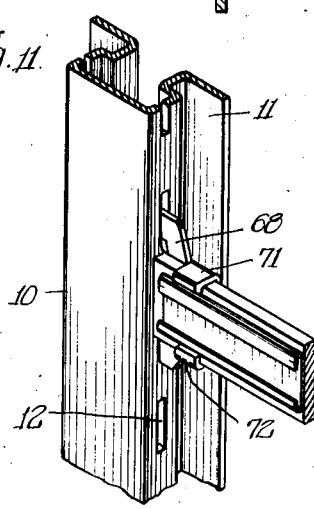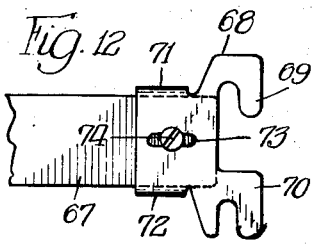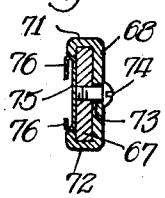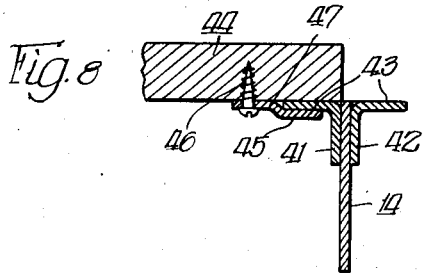

2,191,701

UNITED STATES PATENT OFFICE 2,191,701

DISPLAY APPARATUS

Fred C. Wood, Winnetka, Ill., assignor to Montgomery Ward & Co., Incorporated, Chicago, Ill., a corporation of Illinois Application May 10, 1938, Serial No. 207,112

6 Claims. (Cl. 248—245)

It is the object of the present invention to provide novel display apparatus having its primary utility in connection with store equipment and designed for the exhibition of various articles of merchandise.

In a copending application filed by me for Letters Patent of the United States is disclosed new and useful improvements in wall construction having particular utility and advantages when incorporated in store service equipment. The present invention may be employed with that wall construction, but its use and field of service is not limited to the same.

In carrying into effect the present invention a novel form of supporting bracket is provided which is adapted to the wall construction referred to, and which, when combined with that construction, affords efficient and effective means for building up varying types of displays of the merchandise to be exhibited. This permits the articles so displayed to be grouped in diversified ways to which the nature and character of the articles will lend themselves, and enables the attainment of artistic and decorative results not ordinarily possible.

To the accomplishment of the foregoing the invention seeks to provide a supporting bracket that is so constructed as to be capable of expeditious application to and removal from its applied position, and which, when so applied, may be locked securely in place.

The invention also has in view the provision of a supporting bracket that is capable of ready adjustment with respect to its support, thus to permit shifting of the position of the bracket to adapt the same to varying conditions attending the creation of the display.

Furthermore, the invention seeks to provide a supporting bracket having provision for association therewith of a variety of supporting adjuncts, whereby the utility of the same is extended.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

While the form of the invention herein shown and described is a practical embodiment of the same, it is to be understood that the invention is susceptible to change, modification and variation without departing from the spirit or sacrificing any of the advantages thereof. The present disclosure, therefore, is to be considered from the illustrative standpoint and not as imposing restriction or limitation on the invention.

In the drawings

Fig. 1 is a perspective view of a supporting bracket constructed in accordance with the present invention and shown in applied position;

Fig. 2 is a top plan view thereof, the support of the bracket being shown in section;

Fig. 3 is a front elevation of the bracket;

Fig. 4 is a side elevation of the bracket partly broken away;

Fig. 5 is a sectional plan view of the bracket and its support, the former being shown in closed or engaging position;

Fig. 6 is a similar view, the bracket being illustrated in open position;

Fig. 7 is a perspective view of a modified form of the bracket;

Fig. 8 is a detail cross-sectional view of the bracket arm and a wooden shelf sustained thereby, illustrating the fastening means between the bracket and the shelf;

Fig. 9 is a similar view illustrating the manner of supporting a glass shelf;

Fig. 10 is a detail perspective view illustrating the adaptation of the bracket for the support and display of a plurality of hats;

Fig. 11 is a perspective view of an accessory bar showing its application to the supporting pilaster;

Fig. 12 is a rear view of one end of the accessory bar and the engaging head associated therewith;

Fig. 13 is a transverse sectional view of the construction illustrated in Fig. 12;

Fig. 14 is a perspective view of an individual hat support and its engaging clip, illustrating the construction and manner of application of the latter to the accessory bar.

Fig. 15 is a section on the line 15—15, Fig. 7.

Fig. 16 is a similar view on the line 16—16, Fig. 15.

Fig. 17 is a section on the line 17—17, Fig. 7.

Fig. 18 is a section on the line 18—18, Fig. 17.

Referring now in detail to the accompanying drawings, the numeral 10 designates a pilaster of the construction such as illustrated and described in the copending application filed by me, and hereinbefore referred to. This is generally of T-shaped configuration in horizontal cross-section and is provided with a pair of oppositely-disposed outwardly-projecting attaching flanges 11. In the application referred to the pilaster 10 is included in a wall construction designed for use in store rooms. Its opposite sides have formed therein a plurality of vertically-aligned elongated narrow slots 12, the purpose of which will presently appear.

While but a single supporting bracket is shown in Fig. 1, it will be understood that a plurality of such brackets may be employed with each pilaster 10, and each of the pilasters included in the entire wall construction may be provided with these supporting brackets so that in their combined relation the supporting brackets, the pilasters, and the adjunctive devices associated therewith constitute display apparatus by which various articles, merchandise or otherwise, may be exhibited.

The numeral 13 designates the supporting bracket in its entirety. It includes an elongated flattened arm 14, which is of plate-like form, which arm tapers from its front to its rear end, and at the latter the arm 14 is of relatively broad dimension.

At one side of the rear end of the arm 14 is located a rigid clamping jaw 15. This includes a forwardly-projecting attaching flange 16, which is rigidly connected to the arm 14, preferably by spot welding, and a supporting flange 17 which extends at right angles to the attaching flange 16. A contact flange 18 is carried by the supporting flange 17, the flange 18 being arranged at right angles to the flange 17, and said contact flange 18 is provided with a plurality of inwardly-extending engaging lugs 19. Each of these engaging lugs is received by one of the slots 12 in the contiguous side of the pilaster 10, and when so received the rigid clamping jaw 15 fits upon the pilaster 10 in any position along the length of the latter at which it is desired to locate the supporting bracket 13.

The jaw 15 has a cap plate 20 which is formed at the upper end of the supporting flange 17 and is bent downwardly into horizontal position, as clearly shown in Figs. 1 and 3.

It is apparent that the clamping jaw 15 and its component parts may be readily formed by stamping, the angular relation of the parts being attained by proper bending in the stamping operation. Thus, the rigid jaw 15 may be produced at relatively small cost.

At the side of the inner end of the arm 14, and disposed oppositely to the fixed clamping jaw 15, is a movable clamping jaw 21. This is a counterpart of the fixed jaw 15. It includes an attaching flange 22 at right angles to which is arranged a supporting flange 23, and at right angles to the latter is a contact flange 24 provided with inwardly-extending engaging lugs 25. These lugs, as is the case with the engaging lugs 19, are designed to enter and be received by the slots 12 at the side of the pilaster 10 opposite to that with which the lugs 19 engage.

While the clamping jaw 21 is movable laterally relatively to the fixed clamping jaw 15, the attaching flange 22 serves its purpose as such through the medium of a sustaining slide 26. This is in the form of a relatively narrow elongated plate at one end of which is formed a plurality of positioning lugs 27 that fit within slots 28 formed in the supporting flange 23, the sustaining slide being spot welded, or otherwise suitably fastened to the flange 23. The body of the slide 26 passes through slots 29 and 30, respectively, formed in the attaching flanges 22 and 16, and is of sufficient length as to extend across the face of the supporting flange 17 to the edge thereof, when the jaws 15 and 21 are in closed position. At such end of the slide 26 its extremity is folded back to provide a supporting head 31 which is spaced from the body of the slide 26 and in which is formed an upwardly-inclined slot 32.

Within the space between the supporting head 31 and the body of the slide 26, is located a locking latch 33 which is mounted on a movable pivot 34, having the form of a headed screw or rivet. This movable pivot is received by the slot 32 so as to be movable along said slot from one end thereof to the other. The locking latch 33 includes a flat latch-arm 35 and a similar trigger-arm 36, these arms extending at substantially right angles to each other, the trigger-arm 36 terminating in a finger tab 37.

In the closed position of the jaws 15 and 21, as illustrated in Figs. 1, 2, 3, and 5, the locking position of the latch 33 is shown. In such position the latch-arm 35 is in horizontal position and bears against the attaching flange 16. This prevents the movable jaw 21 moving away from the fixed jaw 15, and the engaging lugs 19 and 25, therefore, will be held in the slots 12 of the pilaster 10 which they occupy, when the supporting bracket is applied to the pilaster. To release the locking latch, and thereby permit the movable jaw 21 to be moved away from the fixed jaw 15, lifting pressure is applied to the finger tab 37 so as to move the pivot 34 to the upper end of the slot 32. In such movement, due to the inclination of the slot 32, the pivot 34 follows that inclination, and when it reaches the top of the slot 32, the locking latch 35 may be turned to the position shown by dotted lines in Fig. 3, in which position the members 35 and 36 are turned at right angles to the positions which they occupy when the latch is in the position illustrated by full lines in Fig. 3. This releases the end of the latch-arm 35 from its engagement with the face of the attaching flange 16, and when sufficient pressure has been applied to the movable jaw 21 it passes outwardly from its contact with the pilaster 10 and thereby releases the engaging lugs 25 from the slots 12 of the pilaster. Thereupon, the fixed jaw 15 may be released from its engagement with the slots 12 with which its fingers 19 are engaged, and the supporting bracket either detached from the pilaster or adjusted to a new position thereon, as the conditions may require.

To assist the movement of the movable jaw 21 with respect to the arm 14 of the support the forward edge of the flange 22 is provided with a guide lug 38 that extends at right angles to the flange 22 and passes through a slot 39 in the arm 14. This guide lug 38 cooperates with the sustaining slide 26 in the movement of the movable jaw 21.

It will be observed also that the jaw 21 is provided with a cap plate 40, which is similar to the cap plate 20.

At opposite sides of the upper edge of the arm 14 is provided a pair of elongated shelf supports 41. These are L-shaped in cross-section, the vertical flanges 42 thereof being suitably connected to the arm 14, as by spot welding or equivalent fastening, while the horizontal flanges 43 project sufficiently away from the arm 14 to support the ends of the shelf members 44 thereon. As illustrated in Figs. 1 and 4, the shelf member 44 is of wood. This is held in place upon the adjacent member 41 by a locking strip 45 secured across the end of the shelf 44, and held in place by screws 46, or their equivalent. The strip 45 has an off-set 47 by which its free edge is spaced from the underside of the shelf 44 in order to receive the horizontal flange 43 of the member 41.

In Fig. 9 the shelf 48 is illustrated as formed of glass. Its end is boxed by a fastening clip 49 of angular formation, and through the bottom of the clip 49 is passed a series of fastening bolts 50 which extend through openings 51 in the horizontal flange of the member 41, whereby the clip 49 is held in engagement with said member 41.

Various forms of supporting adjuncts may be associated with the supporting bracket 13, or the series thereof that are employed with the pilasters 10. One of these is illustrated in Fig. 7 which shows the adaptation of the support for sustaining garment hanging rods 52. In such adaptation the bar 13 is provided at its forward end with oppositely-disposed receiving sockets 53 of semi-circular formation. Each of these sockets 53 is provided with a fastening lug 54 which is designed to enter an opening 55 formed in the rod 52, the latter being tubular, as shown, to permit the opening 55 being punched or otherwise suitably formed in the shell of the tube.

The rods 52 employed with the modified form of the support illustrated in Fig. 7 are used for sustaining the weight of suits of clothes that may be hung upon the rods. Obviously, this necessitates the reinforcing and strengthening of the modified form of the supporting bracket 13. To this end a bracing strut 56 is introduced into the support structure. The forward end of this strut 56 is connected to spaced fastening clips 57, which are carried by the bar 13. The bracing strut 56 is U-shaped in cross-section, being folded upon itself in a transverse direction, the rear end of the strut 56 being suitably fastened to an anchoring plate 58 that is carried by the lower end of the supporting flange 17 of the rigid jaw 15. In the modified form shown in Fig. 7 the rigid and movable jaws are of greater length than that shown in the other views. The anchoring plate 58 fits within the fold of the strut 56 and is provided with a slot 59 for receiving a retaining screw 60 carried by a keeper 61 which spans the anchoring plate 58 and is slidable therealong. The rear ends of the sides of the keeper 61 are spread apart to form receiving jaws 62 that embrace the forward edges of the attaching flanges 16 and 22, and when the keeper 61 is moved into such embracing relation with said flanges the lower end of the movable jaw is held in engagement with the lower end of the fixed jaw.

In Fig. 10 is illustrated an adjunctive support for the display of a plurality of hats. This comprises a flanged head 63 of right-angular formation, which head is attached to one of the supporting flanges 41 of the support 13, being held in engagement therewith by a screw or screws 64. The head 63 has connected thereto at spaced intervals a series of resilient sockets 65 that receive the ends of supporting bars 66. To these bars 66 the hats to be displayed may be connected by any suitable means.

In Fig. 11 there is illustrated an accessory bar 67 on which may be mounted various forms of individual merchandise supports. The bar 67 corresponds generically to the supporting bracket 14. It may be mounted in supporting relation to a single pilaster, or it may extend between a pair of pilasters and be suitably connected to each to be supported thereby. For connecting the accessory bar 67 to the pilaster it is provided at each of its ends with an engaging head 68 in the form of a flat plate having upper and lower engaging hooks 69 and 70. The head 68 is also provided with reversely arranged guide clips 71 and 72 which engage respectively the upper and lower edges of the bar 67 so as to slide therealong, and retain the engaging head 68 against displacement from the bar. As a further means of holding the head 68 on the end of the bar 67 the head 68 is provided with a longitudinal slot 73 in which is fitted a headed fastening 74 which is carried by the bar 67. The slot 73 will limit the sliding movement of the head 68 on the bar 67 as the ends of the slot contact the headed fastening 74.

At the front face of the bar 67 is arranged a pricing card retainer 75 formed at its upper and lower edges with reversely arranged retaining flanges 76. The price cards may be placed within these flanges and held thereby on the retainer 75.

As instancing the use of the accessory bar 67 for the attachment of individual display supports, reference is made to Fig. 14. In this figure is disclosed a support for the display of a single hat. It comprises a supporting head 77 carried by a standard 78, the head 77 preferably being screw threaded to the standard 78 for detachment therefrom or substitution of another form of supporting head, while said standard 78 is connected at its opposite end to an attaching clip 79. This is preferably formed of sheet metal of relatively heavy gauge that has an open-sided rectangular guide-head 80 that is designed to fit over the upper edge of the accessory bar 67 and to be slidable along said upper edge. To permit application of the individual display bracket to the accessory bar 67, and its removal therefrom, the upper flange 76 of the pricing card retainer 75 is notched at appropriate points, as at 81, and this will permit the body of the fastening clip 79, when opposite any one of these notches 81, to be moved transversely of the bar 67, either upwardly or downwardly, and thereby enable the fastening clip 79 to enter or be removed from the space between the flanges 76 of the pricing card retainer 75.

It will be observed that the body fastening clip is folded back upon itself at its lower edge and thereby provides a locking rib 82 at the inner face of the clip. This locking rib is of such width that, by its contact with the upper flange 76 of the retainer 75, it will prevent displacement of the fastening clip 79 until the locking rib is opposite one of the notches 81. When so positioned the clip 79 may be moved vertically from the retainer 75, and the individual display support thereupon may be released from its engagement with the accessory bar 67.

In the application of the accessory bar 67 to the pilasters 10, the bar is placed between a pair of the pilasters, the hooks 69 and 70 of the head 68 at one end of the bar being inserted into a pair of the slots 12 of the adjacent pilaster and engaged with the ends of the slots. The opposite engaging head 68 then may be slid along the bar 67 so that its hooks 69 and 70 may enter a pair of the slots 12 in the opposite pilaster, whereupon these hooks are engaged with the ends of the last mentioned slots. In this manner the bar 67 is held in supporting position.

It will be understood that various forms of individual display supports may be employed with the accessory bar 67, the hat support shown in Fig. 14 being only one example and serving as an illustration. Shoe brackets, tennis racket supports, and various other types may be used, it being only necessary to equip each of the same with the attaching clip 79 to enable their use with the bar 67. Thus, the range of utility of the latter may be greatly extended.

I claim:

1. In display apparatus of the type described, the combination with a supporting element having a plurality of openings in its opposite sides, of a supporting bracket mounted on said supporting element and projecting outwardly therefrom, a fixed clamping jaw connected to said supporting bracket at one of its sides, a movable clamping jaw associated with said supporting bracket at its opposite side, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, and a pivoted locking latch carried by the sustaining slide in advance of the fixed clamping jaw and engageable with the fixed clamping jaw in the closed position of the movable jaw thereon, whereby to maintain the supporting bracket in locked relation to the supporting element.

2. In display apparatus of the class described, the combination with a supporting element having a plurality of openings in its opposite sides, of a supporting bracket mounted on said supporting element and projecting outwardly therefrom, a fixed clamping jaw connected to said supporting bracket at one of its sides, a movable clamping jaw associated with said supporting bracket at its opposite side, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, a pivoted locking latch carried by the sustaining slide in advance of the fixed clamping jaw and engageable with the fixed clamping jaw in the closed position of the movable clamping jaw thereon, whereby to maintain the supporting bracket in locked relation to the supporting element, and a guide lug carried by the movable clamping jaw and engaging an opening in the supporting bracket, said guide lug cooperating with the sustaining slide in the movement of the movable jaw.

3. In display apparatus of the class described, the combination with a supporting element having a plurality of openings in its opposite sides, of a supporting bracket mounted on said supporting element and projecting outwardly therefrom, a fixed clamping jaw connected to said supporting bracket at one of its sides and including a supporting flange and a contact flange disposed in angular relation to said fixed clamping jaw and to each other, a movable clamping jaw associated with said supporting bracket at its opposite side and also including a supporting flange and a contact flange disposed in angular relation to said movable clamping jaw and to each other, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, and a pivoted locking latch carried by the sustaining slide in advance of the supporting flange of the fixed clamping jaw and engageable with the fixed clamping jaw in the closed position of the movable clamping jaw thereon, whereby to maintain the supporting bracket in locked relation to the supporting element.

4. In display apparatus of the class described, the combination with a supporting element having a plurality of openings in its opposite sides, of a supporting bracket mounted on said supporting element and projecting outwardly therefrom, a fixed clamping jaw connected to said supporting bracket at one of its sides and including a supporting flange and a contact flange disposed in angular relation to said fixed clamping jaw and to each other, a movable clamping jaw associated with said supporting bracket at its opposite side and also including a supporting flange and a contact flange disposed in angular relation to said movable clamping jaw and to each other, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, a pivoted locking latch carried by the sustaining slide in advance of the supporting flange of the fixed clamping jaw and engageable with the fixed clamping jaw in the closed position of the movable clamping jaw thereon, whereby to maintain the supporting bracket in locked relation to the supporting element, and a guide lug carried by the movable clamping jaw and engaging an opening in the supporting bracket, said guide lug cooperating with the sustaining slide in the movement of the movable jaw.

5. In display apparatus of the class described, the combination with a supporting element having a plurality of openings in its opposite sides, of a supporting bracket mounted on said supporting element and projecting outwardly therefrom, a fixed clamping jaw connected to said supporting bracket at one of its sides, a movable clamping jaw associated with said supporting bracket at its opposite side, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, the extremity of said slide being rebent to form a supporting head, and a locking latch pivotally-mounted loosely in said supporting head and engageable with the fixed clamping jaw in the closed position of the movable clamping jaw thereon whereby to maintain the supporting bracket in locked relation to the supporting element.

6. In display apparatus of the class described, the combination with a supporting element having a plurality of openings in its opposite sides, of a supporting bracket mounted on said supporting element and projecting outwardly therefrom, a fixed clamping jaw connected to said supporting bracket at one of its sides, a movable clamping jaw associated with said supporting bracket at its opposite side, said fixed and movable clamping jaws provided with means for engaging the openings in the opposite sides of said supporting element to connect the supporting bracket to the latter, a sustaining slide fixedly connected to the movable clamping jaw and passing freely through the fixed clamping jaw, the extremity of said slide being rebent to form a supporting head, a locking latch including a latch arm and a trigger arm extending at substantially right angles to each other, a pivot for said locking latch, the supporting head having an upwardly-inclined slot loosely receiving said pivot, whereby in one position of said locking latch the latch arm is adapted to engage the fixed clamping jaw to hold the movable clamping jaw in locked relation thereto, and in the reverse position of the locking latch the latch arm is released from engagement with the fixed clamping jaw.

FRED C. WOOD.